(12) United States Patent
Wasson et al.

(10) Patent No.: US 11,460,212 B2
(45) Date of Patent: Oct. 4, 2022

(54) MOTOR WITH INTEGRATED ENVIRONMENTAL SENSOR(S)

(71) Applicant: McMillan Electric Company, Woodville, WI (US)

(72) Inventors: Dewain Wasson, Hudson, WI (US); David Lawrence Dahlen, Spring Valley, WI (US); Cory Mark Hedlund, River Falls, WI (US)

(73) Assignee: MCMILLAN ELECTRIC COMPANY, Woodville, WI (US)

( * ) Notice: Subject to any disclaimer, the term of this patent is extended or adjusted under 35 U.S.C. 154(b) by 768 days.

(21) Appl. No.: 15/800,449

(22) Filed: Nov. 1, 2017

(65) Prior Publication Data
US 2018/0119980 A1 May 3, 2018

Related U.S. Application Data

(60) Provisional application No. 62/415,731, filed on Nov. 1, 2016.

(51) Int. Cl.
| | | |
|---|---|---|
| *H02P 3/00* | (2006.01) |
| *F24F 11/89* | (2018.01) |
| *H02K 11/25* | (2016.01) |
| *H02K 11/33* | (2016.01) |
| *F04D 25/06* | (2006.01) |
| *F24F 11/00* | (2018.01) |
| *F04D 27/00* | (2006.01) |

(Continued)

(52) U.S. Cl.
CPC .............. *F24F 11/89* (2018.01); *F04D 25/06* (2013.01); *F04D 27/004* (2013.01); *F24F 11/0001* (2013.01); *F24F 11/77* (2018.01); *H02K 11/20* (2016.01); *H02K 11/25* (2016.01); *H02K 11/30* (2016.01); *H02K 11/33* (2016.01); *F24F 2110/10* (2018.01); *F24F 2110/20* (2018.01)

(58) Field of Classification Search
USPC .......................................................... 318/473
See application file for complete search history.

(56) References Cited

U.S. PATENT DOCUMENTS

| | | |
|---|---|---|
| 5,626,288 A | 5/1997 | Huber |
| 5,850,968 A | 12/1998 | Jokinen |

(Continued)

FOREIGN PATENT DOCUMENTS

DE          3715244 A1 * 11/1987  .............. E05F 15/71

OTHER PUBLICATIONS

BU6904GF/NUX, "The industry's first fan motor driver with integrated Hall sensor and Digital AGC function," http://www.rohm.com/web/eu/news-detail?news-title=2012-11-22-the-industry%E2%80%99s-first*-fan-motor-driver-withintegrated-hall-sensor-and-digital-agc-function&defaultGroupId=false, ROHM, Nov. 22, 2012, 2 pages.

(Continued)

*Primary Examiner* — Kawing Chan
*Assistant Examiner* — Gabriel Agared
(74) *Attorney, Agent, or Firm* — Merchant & Gould P.C.

(57) ABSTRACT

An electric motor includes: a control board including circuitry for controlling the electric motor; a cover with an interior space; and a sensor device coupled to the motor and extending into an external environment, the sensor device being thermally isolated from the interior space of the cover and including a sensor configured to measure at least one environmental characteristic of the external environment.

11 Claims, 9 Drawing Sheets

(51) Int. Cl.
  *H02K 11/30* (2016.01)
  *F24F 11/77* (2018.01)
  *H02K 11/20* (2016.01)
  *F24F 110/20* (2018.01)
  *F24F 110/10* (2018.01)

(56) References Cited

U.S. PATENT DOCUMENTS

| | | | |
|---|---|---|---|
| 5,902,183 A | 5/1999 | D'Souza | |
| 6,850,019 B2 | 2/2005 | Gerfast | |
| 8,219,249 B2 | 7/2012 | Harrod et al. | |
| 8,346,397 B2 | 1/2013 | Harrod et al. | |
| 2007/0243820 A1* | 10/2007 | O'Hagin | F24F 11/0001 454/365 |
| 2010/0033119 A1* | 2/2010 | Becerra | F24F 11/77 318/400.09 |
| 2012/0046797 A1* | 2/2012 | Grohman | F24F 11/30 700/296 |
| 2012/0230839 A1* | 9/2012 | Hussey | F25B 49/02 417/42 |
| 2014/0265976 A1* | 9/2014 | Weiss | G05B 11/01 318/471 |
| 2014/0277758 A1 | 9/2014 | Wasson et al. | |
| 2015/0147188 A1 | 5/2015 | Danielsson | |

OTHER PUBLICATIONS

Ventilation Products, "Exhaust Fan Catalog," http://www.airkinglimited.com/catalogs/ExhaustFanCatalog.pdf, Air King Ventilation Products, 2012, 28 pages.

Delta, "Breez GreenBuilder Ventilation Fan/Light," http://www.deltabreez.com/Upload/SalesBinder/5_IM/3_GreenBuilder/IM_GBR80HL_GBR80MHL_e.pdf, Delta, 2013, 4 pages.

Lavars, Nick, "Haiku smart ceiling fan knows when to go for a spin," http://www.gizmag.com/haiku-senseme-smart-ceiling-fan/32430/, Jun. 6, 2014, 6 pages.

Ebmpapst, "Sensor Fans, More comfort in climate control," ebmpapst, http://www.ebmpapst.com/media/content/overview_of_industries/automotive/downloads/Automotive_brochure_sensor_fans_EN.pdf, Dec. 31, 2015, 8 pages.

Vantage Pro, "6151 Wireless Vantage Pro & 6161 Wireless Vantage Pro Plus," http://ct.id.au/weather/station/vantage-pro-brochure.pdf, 2016, 3 pages.

WeatherLog ASPRH/T, "The Rainwise Aspirated Relative Humidity and Temperature Sensor," http://www.rainwise.com/products/attachments/6750/20060215113923.pdf, RainWise Inc., 2016, 1 page.

* cited by examiner

MOTOR WITH INTEGRATED ENVIRONMENTAL SENSOR(S)

BACKGROUND

Brushless direct current motors, also referred to as electronically commutated motors, are often used in such as applications as attic ventilation systems and Heating, Ventilating, and Air Conditioning (HVAC) systems due to the high efficiency, long life, and ease of controlling speed, torque, and airflow. These motors can be used to drive such components as fans associated with the attic ventilation and HVAC systems.

SUMMARY

In a first aspect, an electric motor includes: a control board including circuitry for controlling the electric motor; a cover with an interior space; and a sensor device coupled to the motor and extending into an external environment, the sensor device being thermally isolated from the interior space of the cover and including a sensor configured to measure at least one environmental characteristic of the external environment.

In a second aspect, a control system for modifying environmental characteristics of a space having an environment includes: an electric motor including: a control board including circuitry for controlling the electric motor; a cover with an interior space enclosing the control board, and the cover with an aperture; and a sensor device positioned to extend through the aperture of the cover and into the environment, the sensor device being thermally isolated from the interior space of the cover and including a sensor configured to measure at least one of the environmental characteristics of the space; and an assembly mechanically coupled to the electric motor, wherein the electric motor manipulates the assembly to modify the environmental characteristics of the space.

DETAILED DESCRIPTION

Embodiments of the present disclosure are directed to a brushless Direct Current (DC) Permanent Magnet (PM) motor with an integrated sensor device configured to sense at least one environmental characteristic, such as temperature and/or humidity sensor. In some examples, the sensor device is integrated in that the sensor device is coupled to a portion, such as a housing, of the motor.

The temperature and humidity sensor can be a solid state device, which makes the sensor small. This sensor can be mounted external to the motor and is thermally removed from the effects of the heat producing components of the motor. The externally mounted device is in optimal position to sense the temperature and humidity of the outside air passing over the motor. This arrangement allows for the microcontroller of the motor to alter the operation of the motor, such as speed or torque output, based on the operating environment (i.e., temperature and/or humidity as sensed by the sensor).

Figure 1:
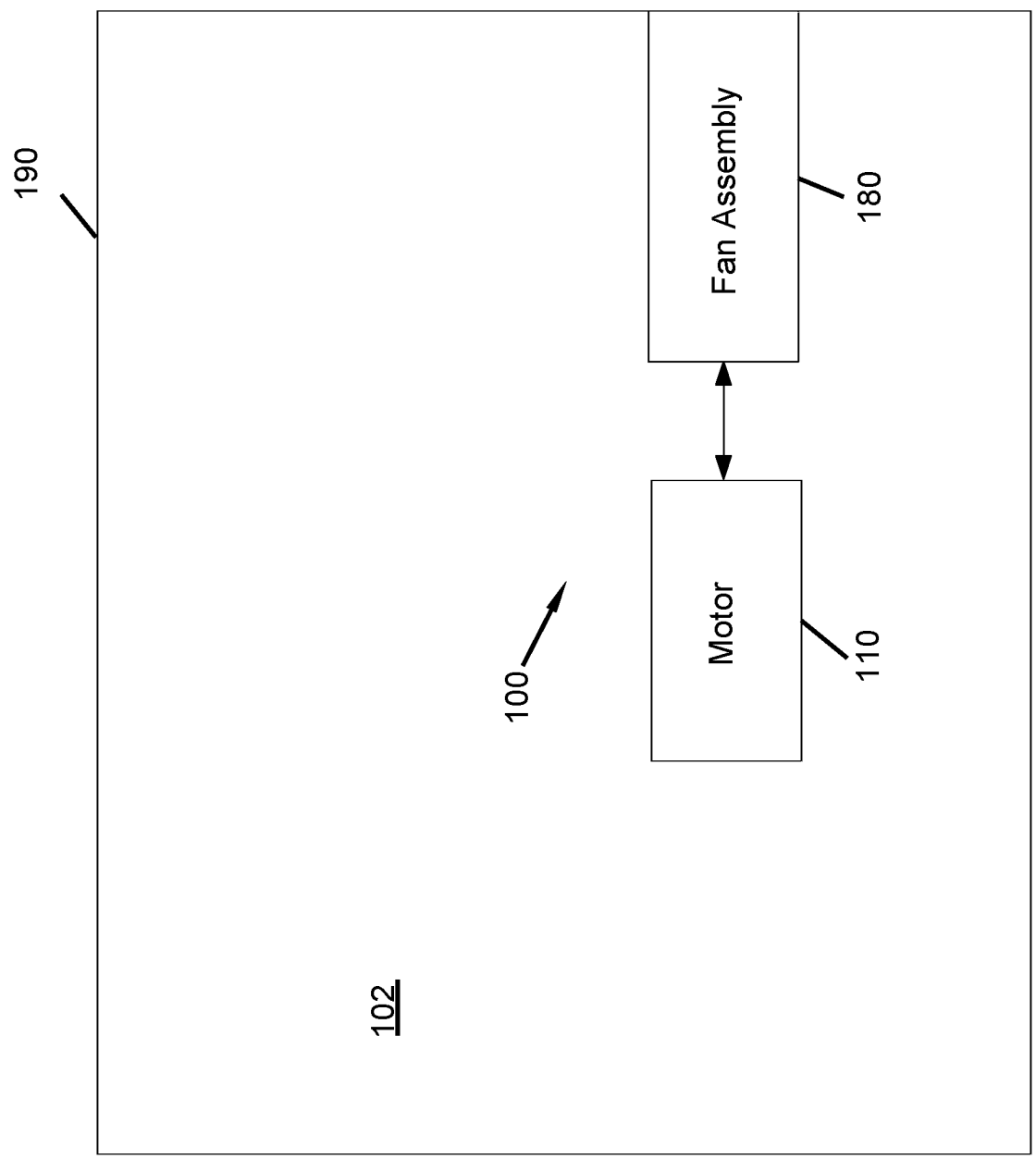
FIG. 1 shows an example environment including a system for manipulating environmental characteristics of the environment.
Figure 2:
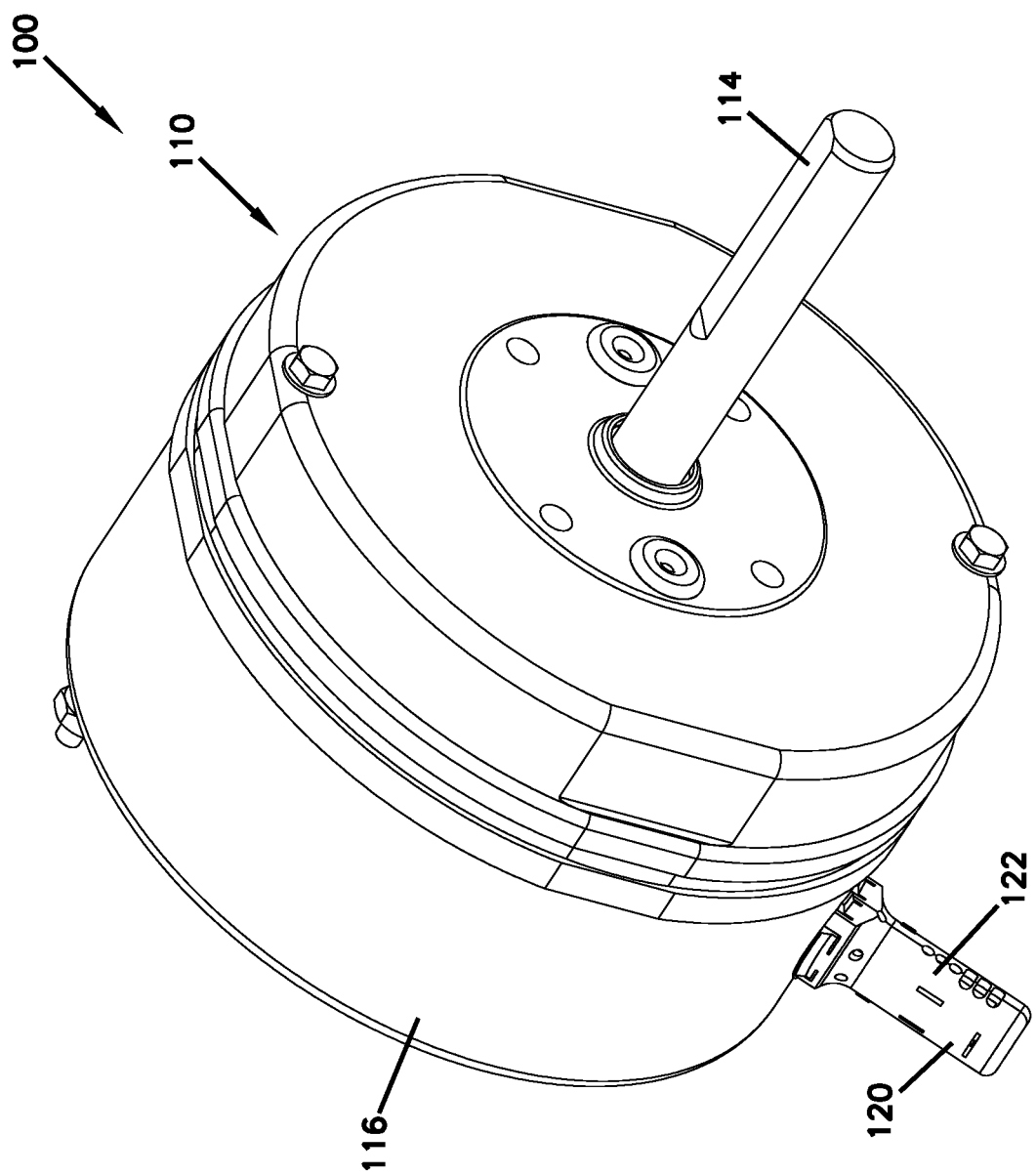
FIG. 2 shows an embodiment of an electric motor with a sensor device for use in an environment such as that shown in FIG. 1.
Figure 3:
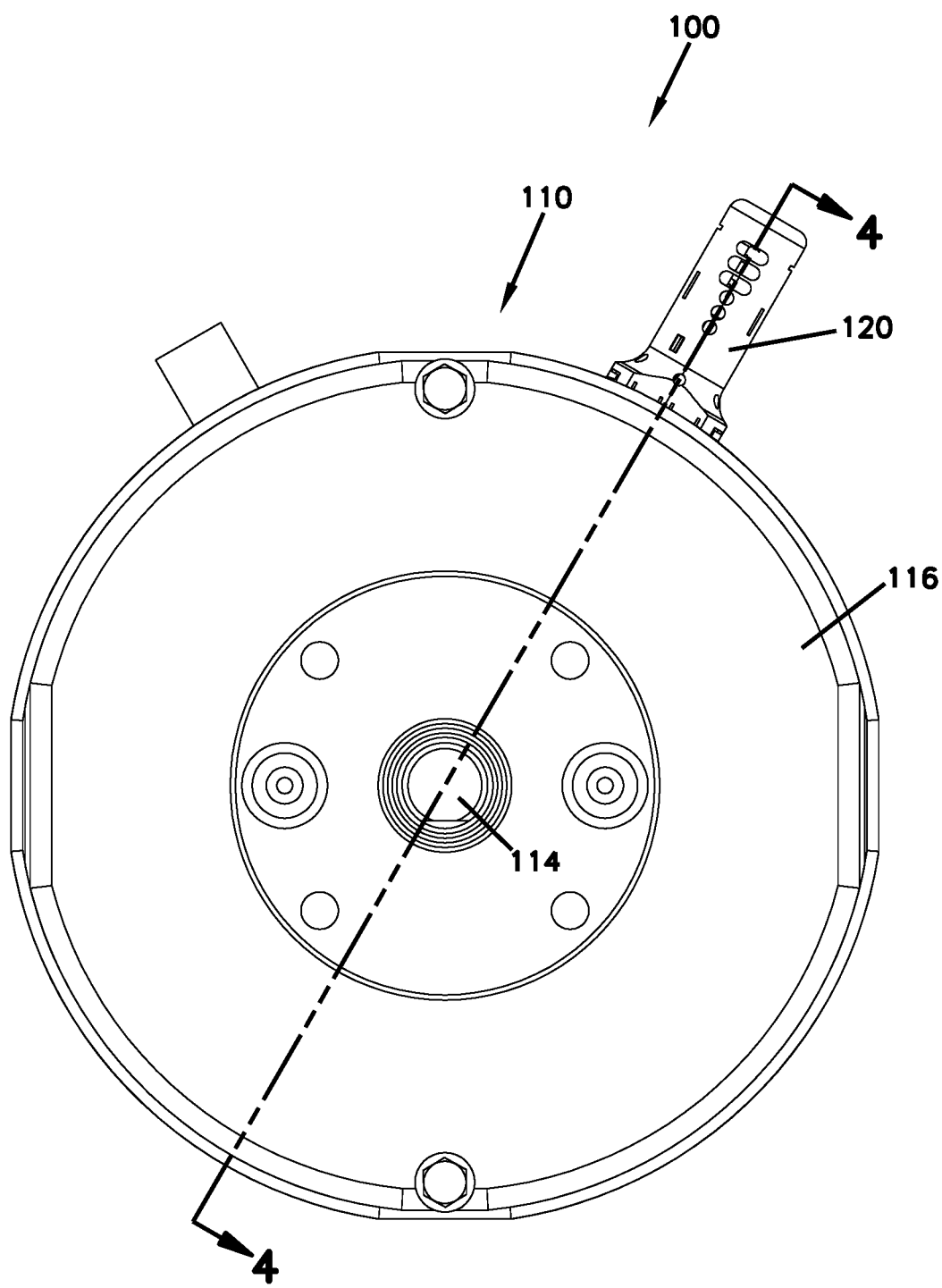
FIG. 3 shows another view of the electric motor of FIG. 2.
Figure 4:
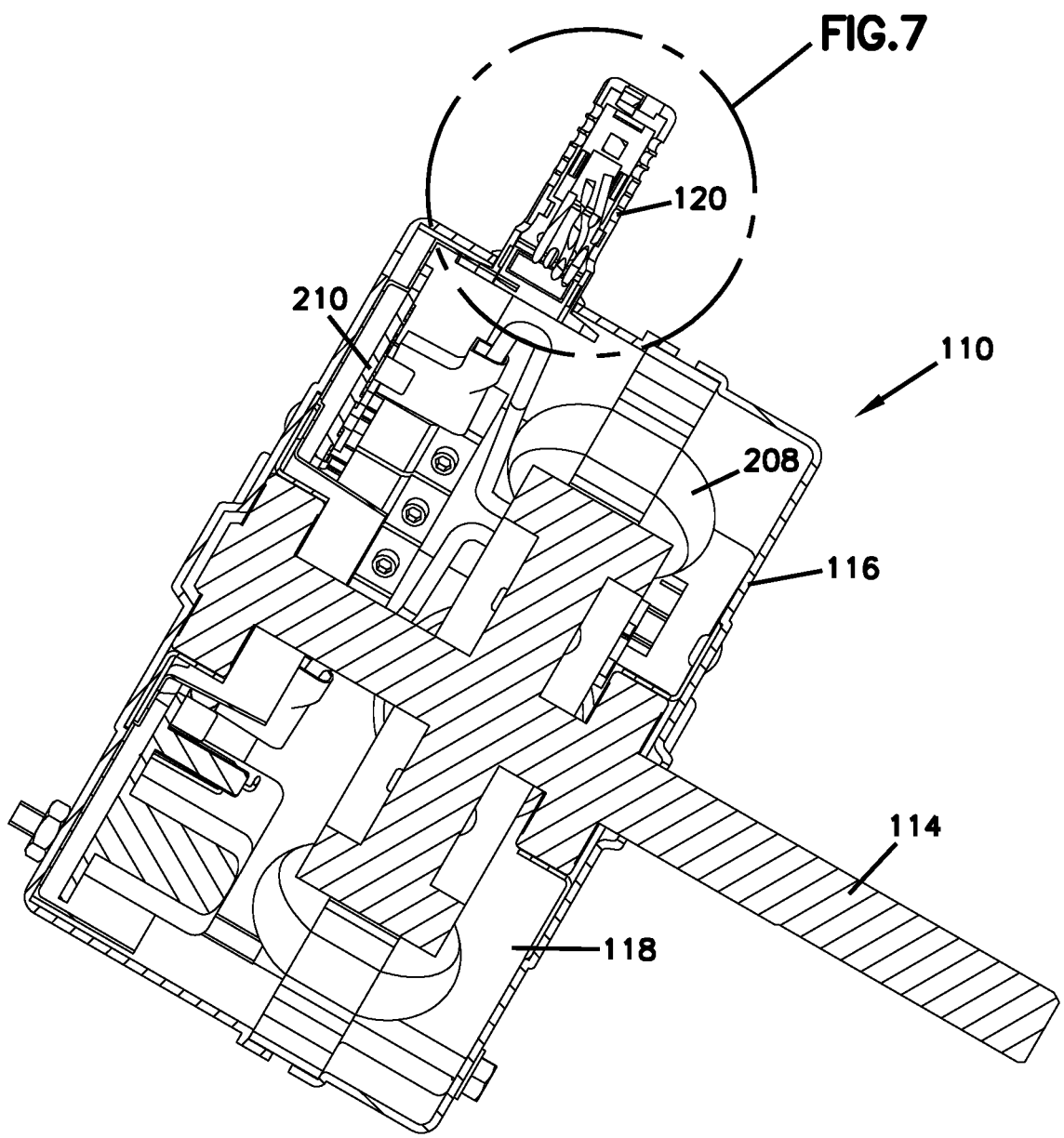
FIG. 4 shows a cross-sectional view of the electric motor of FIG. 3.
Figure 5:
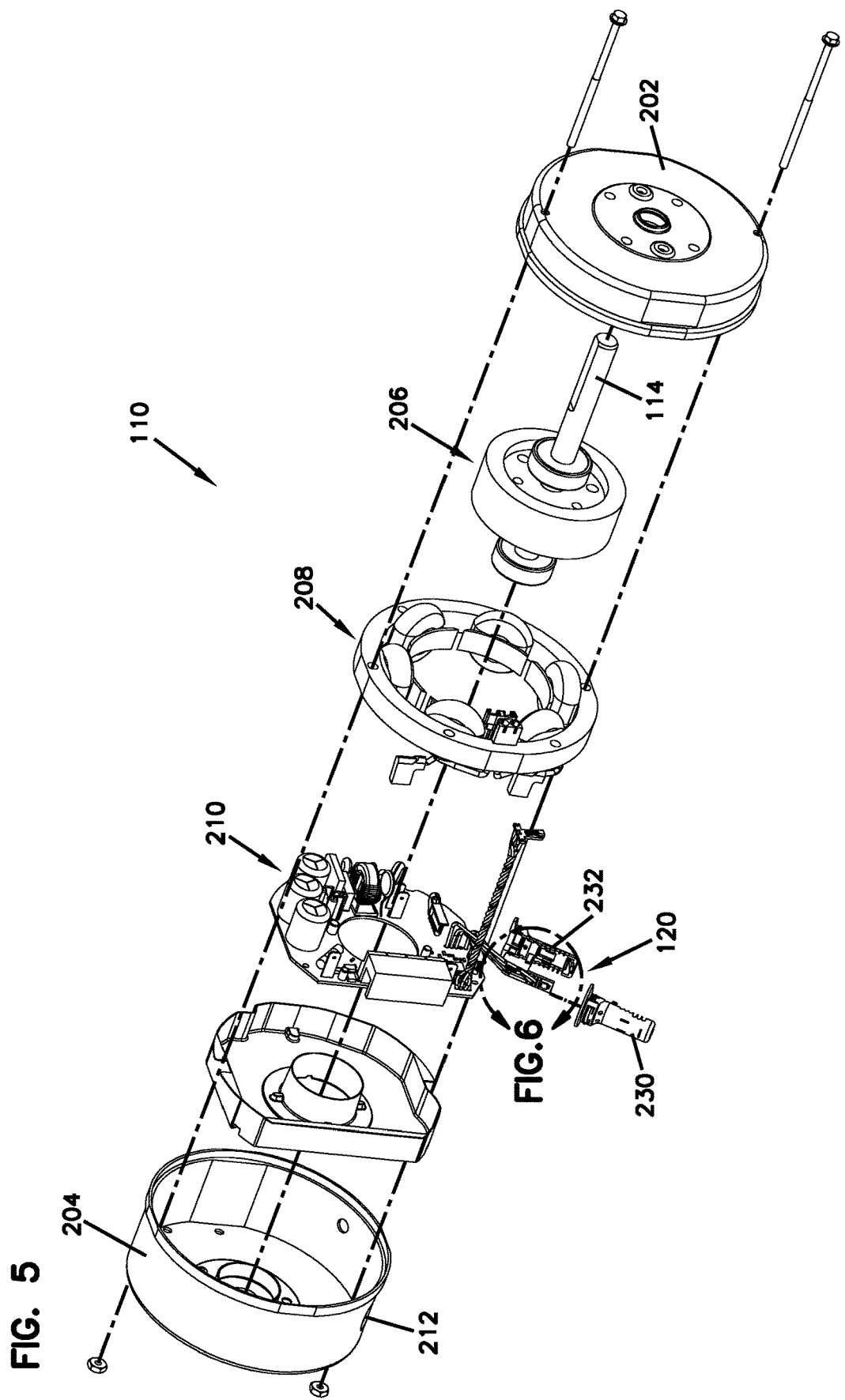
FIG. 5 shows an exploded view of the electric motor of FIG. 2.

FIG. 1 shows an example space 190 having an environment 102 in which principles of this disclosure can be practiced. In this example, the environment 102 includes a control system 100 with an electric motor 110 and a fan assembly 180. The motor 110 is mechanically coupled to the fan assembly 180 to cause the fan assembly 180 to turn. By doing so, the fan assembly 180 manipulates the environmental characteristics of the environment 102, such as the temperature and/or humidity associated with the environment 102.

For example, in one embodiment, the space 190 is an attic space of a structure, and the motor 110 and fan assembly 180 are positioned in the attic space. As described further below, the motor 110 and the fan assembly 180 can be manipulated to change the temperature and/or humidity in the attic space such as, for example, causing the motor 110 to manipulate the fan assembly 180 to expel air from within the space 190 out of the space 190. In other examples, the control system 100 can be used in other contexts, such as being part of an HVAC system.

Referring now to FIGS. 2-5, a portion of the control system 100 is shown. In this example, the motor 110 is an electrically commutated DC motor similar to that described in U.S. Pat. No. 6,850,019 to Gerfast, the entirety of which is hereby incorporated by reference. Other motor configurations are possible.

The motor 110 includes a shaft 114 that is driven by the motor 110. The shaft 114 can extend to various components of the control system 100, such as a fan.

The motor 110 also includes a cover 116 formed by a first endcover 202 and a second endcover 204 that are coupled to form a space 118 therein that encloses and substantially isolates the internal components of the motor 110 from the environment 102 surrounding the motor 110. The internal components of the motor 110 include a rotor assembly 206 that is coupled to the shaft 114. A stator 208 is positioned within the cover 116. A control board 210 is positioned within the cover 116 and includes circuitry to control the motor 110 (see FIG. 8).

A sensor device 120 is electrically connected to the control board 210. The sensor device 120 protrudes from the cover 116. In this example, the sensor device 120 is generally isolated from the heat generated by the components of the motor enclosed by the cover 116. The sensor device 120 extends into the environment 102, and the sensor device 120 is configured to sense various environmental attributes associated with the environment 102, such as the temperature and/or humidity of the environment 102.

Figure 6:
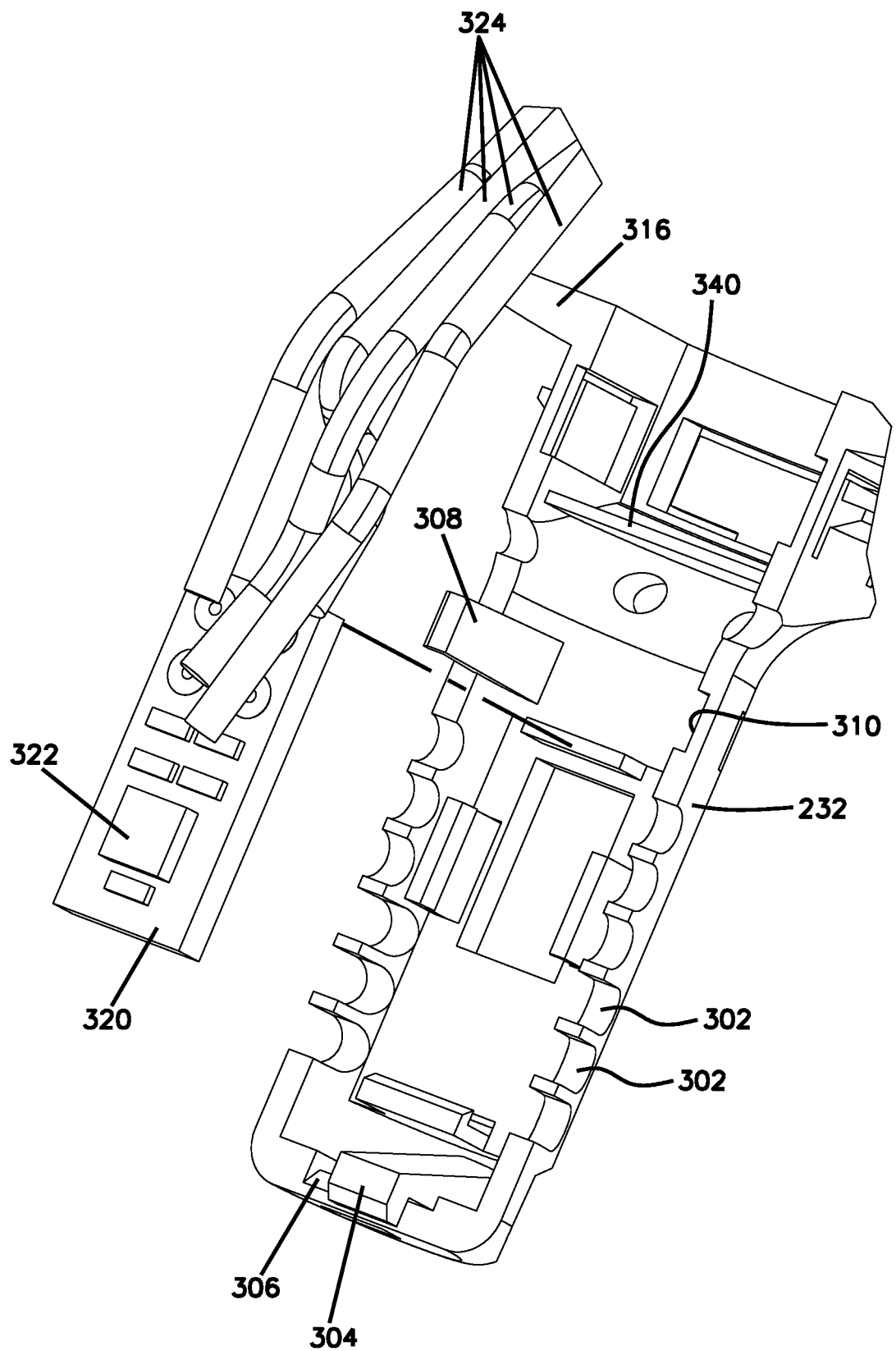
FIG. 6 shows an exploded view of a portion of an example sensor device of the electric motor of FIG. 5.
Figure 7:
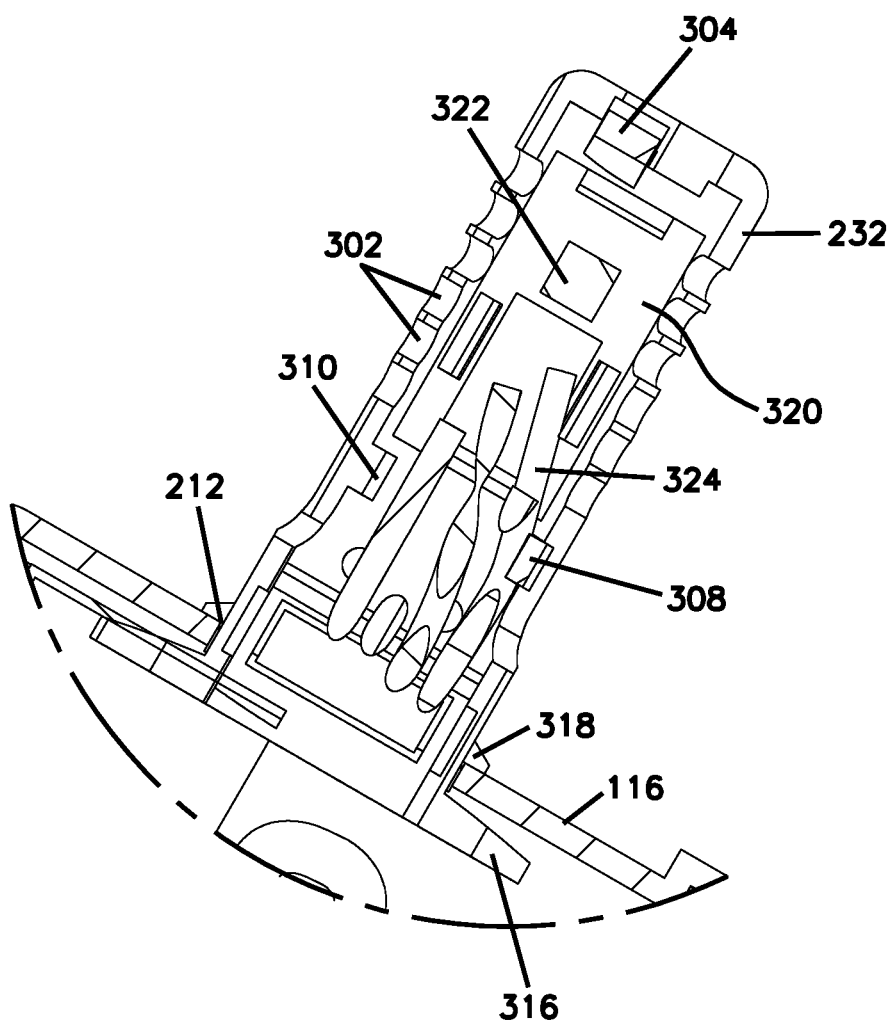
FIG. 7 shows an enlarged view of the sensor device of the electric motor of FIG. 4.

Referring now to FIGS. 6-7, the sensor device 120 is shown in more detail. In this example, the sensor device 120 includes enclosure components 230, 232 that snap together to form an enclosure 122 to enclose a solid-state sensor 322 therein. In this example, the enclosure components 230, 232 are identical in construction. The enclosure component 232 includes snaps 304, 308 and engagement points 306, 310 that mate with the snaps and engagement points of the enclosure component 230 to form the enclosure 122.

The enclosure components 230, 232 of the enclosure 122 include a base portion 316 that is generally cylindrical in shape and is larger in diameter than the remainder of the enclosure 122. The enclosure components 230, 232 also form a tab 318 spaced apart from the base portion 316. This allows the sensor device 120 to extend through an aperture 212 in the cover 116 of the motor 110 while having the cover 116 be captured between the base portion 316 and the tab 318 so that the sensor device 120 is integrally coupled to the cover 116 of the motor 110. In this example, the sensor device 120 can be pushed through the aperture 212 until the tab 318 clears the aperture 212 and the cover 116 is captured between the base portion 316 and the tab 318, as shown in FIG. 7.

In this example, the enclosure components 230, 232 are made from a thermoplastic material. The thermoplastic material of the enclosure 122 provides electrical isolation to the cover 116 (which is typically made of a conductive metal) of the motor 110 and earth ground. The enclosure 122 further includes an optional thermal barrier 340 that is positioned between the internal compartment of the motor 110 and the environment 102 wherein the sensor device 120 is positioned to sense temperature and/or humidity. The enclosure 122 locates the sensor some distance away from the cover 116 of the motor 110.

Each of the enclosure components 230, 232 has small openings 302 to allow the ambient air from the environment 102 to flow over the solid-state sensor 322. The enclosure 122 also provides mechanical support and protects the solid-state sensor 322 from incidental contact.

In this example, the solid-state sensor 322 is a HDC1080DMBT digital humidity sensor with temperature sensor manufactured by Texas Instruments Incorporated of Dallas, Tex. The solid-state sensor 322 sensor is mounted to a small circuit board 320 and is directly connected to the control board 210 by electrical wires 324. Other configurations are possible. For example, in another embodiment, the control board 210 can be enlarged to extend into the sensor device 120 to hold the solid-state sensor 322 so that only a single printed circuit board is needed.

Figure 8:
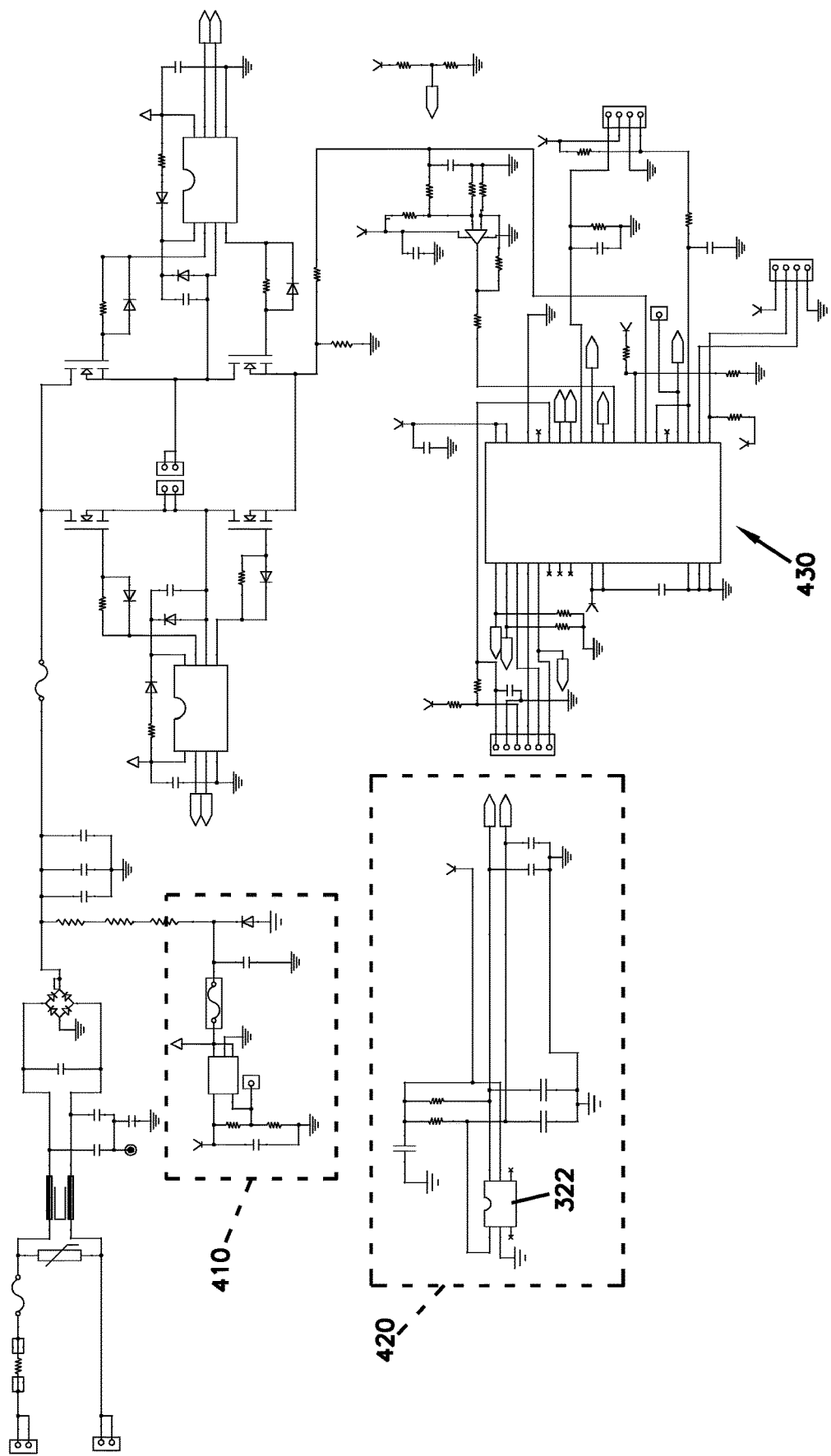
FIG. 8 shows an example schematic of the electrical circuitry of the electric motor of FIG. 2.
Figure 9:
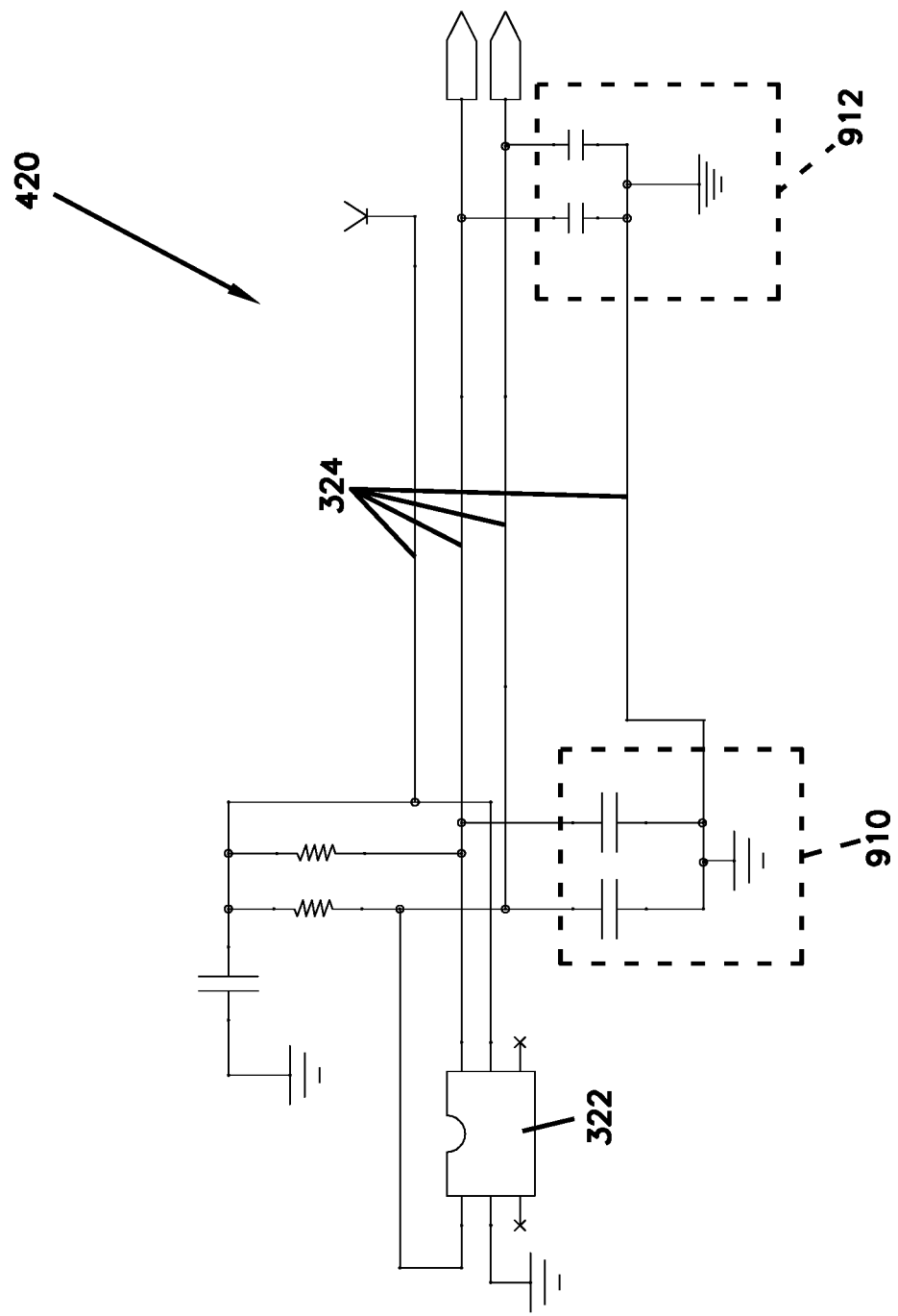
FIG. 9 shows a portion of the electrical circuitry of FIG. 8.

Referring now to FIGS. 8-9, a schematic view of the electrical components of the motor 110 is shown. There is a single logic voltage supply 410 that is derived from a 120 or 240 $V_{rms}$ AC power source that is filtered into a high voltage bus. This single logic voltage supply 410 provides power to a microcontroller 430 and circuitry 420 for the solid-state sensor 322. In this embodiment, the solid-state sensor 322 and microcontroller 430 are electrically connected directly without requiring isolation.

This configuration may result in high voltage switching currents that are prevalent in most electronically commutated motors that are powered from AC mains, which can impact the performance of the sensor device 120 and/or impact communication between the sensor device 120 and the microcontroller 430. This can cause ground displacements and inductive or capacitive coupling between the power wires or printed wiring board traces and the sensor signal lines. Also of concern is externally induced transient noise. In some embodiments, the signal from the solid-state sensor 322 could be electrically isolated from the mains circuit, but may add to complexity and expense.

Instead, in this embodiment, the solid-state sensor 322 is thermally isolated from the internal ambient of the motor 110 (i.e., by the thermal barrier 340) while keeping the electrical wires 324 between the small circuit board 320 of the solid-state sensor 322 and the microcontroller 430 short in distance to negate propagated electrical noise. In one example, the electrical wires 324 are less than 6 inches, 5 inches, 4 inches, and/or 3 inches in length. In one example, the electrical wires are approximately 3.5 inches in length.

The circuitry 420 for the solid-state sensor 322 uses passive R/C networks 910, 912 on each side of the solid-state sensor 322 communication lines to filter this unwanted noise. The passive R/C networks 910, 912 are configured to minimize noise while communicating at a rate that can withstand the resulting delays caused by such filter components.

In example embodiments, the input from the sensor device can be used to modify the operating characteristics of the motor. For example, if the sensor device senses an increase in temperature and/or humidity, the sensor device can communicate that to the microcontroller. The microcontroller can, in turn, use logic to determine if the operating characteristics should be modified, such as by: (i) turning on the motor; (ii) increasing the speed of the motor; (iii) decreasing the speed of the motor; and/or (iv) turning off the motor.

In example embodiments, the logic that is used to receive the output from the sensor device and manipulate the operation of the motor can be adjusted through firmware updates and/or through an adjustment mechanism provided on the motor. For example, a potentiometer can be formed as an integral part of the motor housing to allow for the manipulation of the operating characteristics of the motor, such as that disclosed in U.S. Patent Published Application No. 2014/0277758 to Wasson, the entirety of which is hereby incorporated by reference.

For example, in an alternative embodiment, the thermal barrier between the sensor device and the interior ambient of the motor can be minimized or eliminated. Instead, the firmware of the microcontroller can be adjusted to compensate for the increase in sensor temperature caused by the internal ambient of the motor. In one embodiment, the firmware can be programmed to adjust (e.g., reduce) the temperature measured by the sensor device based upon the performance of the motor. As the motor runs, the internal ambient of the motor increases in temperature based upon a time and/or speed/load of the motor until reaching a steady-state. The firmware can be programmed to determine a length of time of running of the motor and/or a speed/load for the motor, estimate a temperature offset, and appropriately adjust the temperature sensed by the sensor device based upon that offset. In other examples, the internal temperature of the motor can be measured, and an offset calculated based thereupon. Other configurations are possible.

Embodiments of the electric motor described herein can be used in various applications. For example, the electric motors can be used in environments in which the electric motor can manipulate characteristics of the environment surrounding the motors. For example, the electric motors can be integrated as part of an active ventilation system in the attic space(s) of structures (see FIG. 1). The sensor device can be utilized to estimate temperature and/or humidity levels of the air within the attic space of a structure and modify the speed of an exhaust fan associated with the ventilation accordingly. For example, if the humidity level within the attic space increases, the sensor device can cause the motor to turn on and/or increase in speed, thereby increasing the movement of air by the fan out of the attic space.

In alternatives embodiments, the sensor device can be configured to estimate other environmental characteristics. For example, the sensor device can be configured to measure smoke or volatile organic compounds (VOCs) in the environment. Other configurations are possible.

Embodiments of this disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium can include any medium that includes media capable of containing or storing the program for use by or in connection with the instruction execution system, apparatus, or device.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An electric motor, comprising:
    a control board including circuitry for controlling the electric motor;
    a cover defining an interior space enclosing the electric motor;
    a sensor device connected to the cover and extending into an external environment of the electric motor, the sensor device including a sensor configured to measure at least one environmental characteristic of the external environment at the electric motor, the at least one environmental characteristic including a temperature and/or a humidity,
    wherein the control board is configured to increase a speed of a fan while the fan is running based on a measurement of the at least one environmental characteristic measured by the sensor device, the motor being mechanically coupled to the fan to cause the fan to turn to manipulate the at least one environmental characteristic of the external environment at the electric motor;
    wherein the control board and the sensor device are configured to be powered from a single high voltage supply;
    wherein the sensor device is electrically connected directly to a microcontroller on the control board; and
    wherein the control board further comprises one or more electrical wires that electrically connect the sensor device to the control board, the electrical wires being less than 4 inches in length.

2. The electric motor of claim 1, wherein:
    the cover defines an aperture;
    the sensor device is positioned to extend through the aperture of the cover; and
    the sensor device includes first and second enclosure components that are identical and snap together to form an enclosure that houses the sensor.

3. The electric motor of claim 1, wherein the sensor device snaps into the cover of the electric motor, and wherein the control board is enclosed within the interior space formed by the cover.

4. The electric motor of claim 1, wherein the sensor device defines openings for airflow from the external environment.

5. The electric motor of claim 1, further comprising a thermal barrier to isolate the sensor device from the interior space of the cover.

6. A control system for modifying environmental characteristics of a space having an environment, the control system comprising:
    an electric motor positioned in the space and including: a control board including circuitry for controlling the electric motor;
    a cover defining an interior space enclosing the control board, and the cover defining an aperture;
    a sensor device connected to the cover and positioned to extend through the aperture of the cover and into the environment at the electric motor, the sensor device being thermally isolated from the interior space of the cover and including a sensor configured to measure at least one of the environmental characteristics of the space at the electric motor, the at least one of the environmental characteristics including a temperature and/or a humidity; and
    a fan assembly positioned in the space and mechanically coupled to the electric motor, wherein the control board is configured to cause the electric motor to rotate a fan of the fan assembly to manipulate the at least one of the environmental characteristics of the space by increasing a speed of the fan while the fan assembly is running, based on a measurement of the one of the environmental characteristics measured by the sensor device;

wherein the control board and the sensor device are configured to be powered from a single high voltage supply;

wherein the sensor device is electrically connected directly to a microcontroller on the control board; and wherein the control board further comprises one or more electrical wires that electrically connect the sensor device to the control board, the electrical wires being less than 4 inches in length.

7. The control system of claim 6, wherein the space is an attic space.

8. The control system of claim 6, wherein the sensor device includes first and second enclosure components that snap together to form an enclosure that houses the sensor.

9. The control system of claim 6, wherein the sensor device snaps into the cover of the electric motor.

10. The control system of claim 6, wherein the sensor device defines openings for airflow from the environment.

11. The control system of claim 6, further comprising a thermal barrier to isolate the sensor device from the interior space of the cover.

* * * * *